United States Patent
Monaghan (10) Patent No.: US 11,731,783 B2
(45) Date of Patent: Aug. 22, 2023

(54) SPARK CONTAINMENT CAP

(71) Applicant: AIRBUS OPERATIONS LIMITED, Bristol (GB)

(72) Inventor: Thomas Monaghan, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 741 days.

(21) Appl. No.: 16/694,038

(22) Filed: Nov. 25, 2019

(65) Prior Publication Data
US 2020/0165006 A1  May 28, 2020

(30) Foreign Application Priority Data

Nov. 26, 2018 (GB) .................................. 1819208

(51) Int. Cl.
*B64D 45/02* (2006.01)
*F16B 37/14* (2006.01)

(52) U.S. Cl.
CPC ............. *B64D 45/02* (2013.01); *F16B 37/14* (2013.01)

(58) Field of Classification Search
CPC ......... B64D 45/02; B64D 37/32; F16B 37/14; F16B 39/02; F16B 37/125; F16B 33/004; F16B 39/225; B29C 47/17; B29C 45/46; B29C 45/14
USPC ...................................................... 361/218
See application file for complete search history.

(56) References Cited

U.S. PATENT DOCUMENTS

| | | | |
|---|---|---|---|
| 4,842,469 A | 6/1989 | Schmidt | |
| 2006/0024122 A1 | 2/2006 | Nealon et al. | |
| 2011/0024943 A1 | 2/2011 | Kelley et al. | |
| 2012/0217673 A1 | 8/2012 | Hutter, III | |
| 2013/0175730 A1* | 7/2013 | Hutter, III | B29C 33/00 425/117 |
| 2014/0048198 A1* | 2/2014 | Dobbin | F16B 39/225 411/375 |
| 2014/0341675 A1* | 11/2014 | Dobbin | B64D 45/02 29/527.2 |
| 2016/0195125 A1* | 7/2016 | Dobbin | B64D 45/02 411/372.6 |
| 2016/0271644 A1 | 9/2016 | Weinmann et al. | |

(Continued)

FOREIGN PATENT DOCUMENTS

| | | |
|---|---|---|
| EP | 2 698 318 | 2/2014 |
| EP | 2740540 | 6/2014 |

(Continued)

OTHER PUBLICATIONS

Combined Search and Examination Report for GB Application No. 1819208.8 dated Apr. 10, 2019, 8 pages.

(Continued)

*Primary Examiner* — Danny Nguyen (74) *Attorney, Agent, or Firm* — Nixon & Vanderhye P.C.

(57) ABSTRACT

A spark prevention cap is disclosed. The cap forms a sealed cavity around an end of a fastener protruding from a surface of a structure, for example, an aircraft structure. The cap has a cap body with an annular base terminating at a rim. The rim surrounds an opening into a central cavity for receiving the end of the fastener. The annular base has an external circumferential surface extending from the base rim, and a mating feature on the external circumferential surface configured to contact a sealant material applied externally to the cap.

19 Claims, 4 Drawing Sheets

(56) References Cited

U.S. PATENT DOCUMENTS

2017/0057137 A1* 3/2017 Erickson .................. B64F 5/40
2020/0032834 A1* 1/2020 Auffinger ................ F16B 35/06

FOREIGN PATENT DOCUMENTS

| EP | 3 059 170 | 8/2016 |
| EP | 3 059 171 | 8/2016 |
| GB | 2519301 | 4/2015 |
| GB | 2557961 | 7/2018 |
| JP | 2013-119335 | 6/2013 |
| WO | 2012/107741 | 8/2012 |
| WO | 2012/161845 | 11/2012 |
| WO | 2013/178985 | 12/2013 |
| WO | 2014/051858 | 4/2014 |
| WO | 2014/118510 | 8/2014 |
| WO | 2014/170672 | 10/2014 |
| WO | 2015/015153 | 2/2015 |
| WO | 2015/025130 | 2/2015 |

OTHER PUBLICATIONS

Extended European Search Report for European Application No. 19205569.7, eight pages, dated Apr. 24, 2020.
United Kingdom Search Report for GB Application No. 1819208.8, three pages, dated Nov. 13, 2019.

* cited by examiner

SPARK CONTAINMENT CAP

CROSS RELATED APPLICATION

This application claims priority to United Kingdom (GB) Patent Application 1819208.8, filed Nov. 26, 2018, the entire contents of which are hereby incorporated by reference.

FIELD OF THE INVENTION

The present invention relates to a spark containment cap for forming a sealed cavity around an end of a fastener. The present invention also relates to a joint, a method of assembling a joint, an aircraft comprising at least one of the cap and the joint, a spark prevention cap installation system, and a method of forming a sealed cavity around an end of a fastener.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightning attachment at any of the many metallic fasteners in the exterior surface, which have a much lower electrical resistance. In the wing, some of these fasteners pass through the outer wing skin into the fuel tank.

Figure 1:
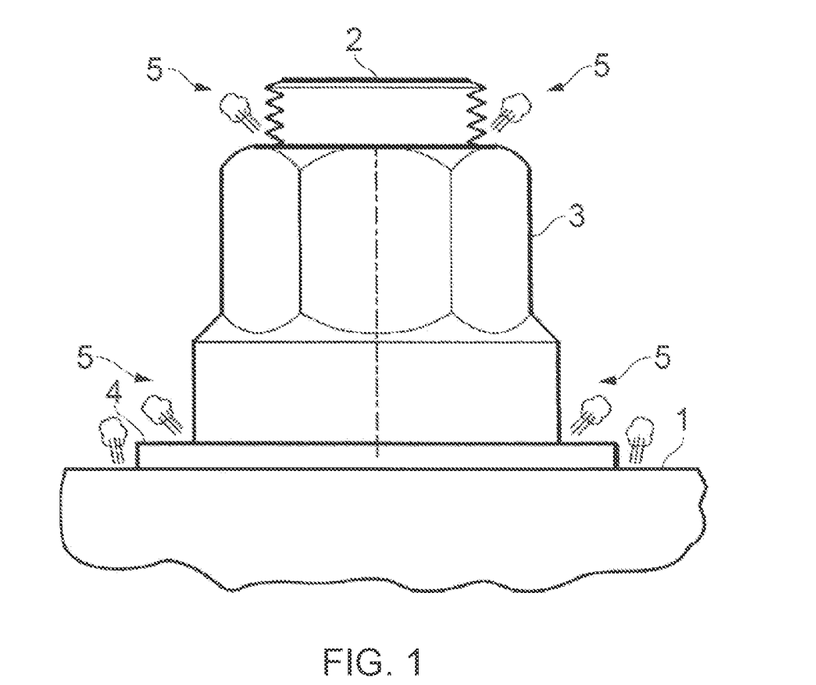
FIG. 1 shows a side view of part of a prior art fastener assembly protruding from a structure.

FIG. 1 is a side view of part of a fastener assembly passing through a panel 1, which may be a composite or metallic panel. The assembly comprises a fastener comprising an externally threaded bolt 2, an internally threaded nut 3, and a washer 4. In the event of a lightning strike hitting the panel 1 and attaching to the fastener, sparking, plasma or outgassing may occur at the locations indicated by reference 5 in FIG. 1.

It is known to provide injectable nut caps, for example WO 2015/025130, which are provided over the end of the fastener protruding from the panel. Such a nut cap is provided to form a sealed cavity around an end of a fastener. An inner cap body is provided that terminates at an inner cap rim which surrounds an opening into a central cavity. An annular skirt terminating at a skirt rim provides an annular pocket between the skirt and the inner cap body, in which a curable sealing material is provided. The skirt may impair location of the nut cap relative to other features.

SUMMARY OF THE INVENTION

According to an aspect of the invention, there is provided a spark prevention cap for forming a sealed cavity around an end of a fastener protruding from a surface of a structure, the cap comprising a cap body with an annular base terminating at a base rim which surrounds an opening into a central cavity for receiving the end of the fastener; the annular base having an external circumferential surface extending from the base rim, and a mating feature on the external circumferential surface configured to contact a sealant material applied externally to the cap.

With this arrangement it is possible to maximise the contact area between the cap and the sealant. The retention of the cap may be improved. Ease of location of an injection tool for applying a sealant material to the cap may be improved.

By providing a flange which does not extend towards the surface of the structure it has been recognised that it is possible to provide a sealant location which provides a suitable adherence of the cap to the surface of the structure. The use of such a flange enables the cap to be located in closer proximity to other features compared to a cap with a skirt, for example.

The cap may comprise an engaging feature configured to engage with the end of the fastener and locate the base rim against the surface of the structure. The base rim may therefore be positioned in a close engagement with the surface of the structure from which the end of the fastener extends. As such, leakage of air and sealant into the central cavity may be minimised.

The engaging feature may comprise at least one tab.

The engaging feature may be adjacent to the base rim.

The mating feature may be spaced from the base rim. As such, a volume may be defined between the mating feature and the surface of the structure in which the sealant is received. Spacing the mating feature away from the base rim may assist with locating the cap in proximity to other features.

The mating feature may comprise at least one of a protrusion on the external circumferential surface and a recess in the annular base.

The mating feature may comprise a flange protruding from the external circumferential surface.

With such an arrangement the mating feature may be easily formed. The surface area of the cap to which sealant may be applied is increased.

The flange may be offset from the base rim.

As such, the nut cap may be positioned in close proximity to features protruding from the surface of the structure.

A free end of the flange may be spaced from a plane defined by the base rim.

The flange may extend substantially parallel to the plane defined by the base rim from the juncture with the external circumferential surface to a free end of the flange.

An axial spacing of the flange from the base rim may be greater than a radial length of the flange.

The flange may be rigid.

The flange may be formed as a one-piece construction.

The recess may be a circumferentially extending channel.

The recess may comprise a plurality of circumferentially extending channels.

The annular base may comprise a single wall configuration.

The opening may be the only opening to the central cavity.

The flange may be circumferentially extending.

The base rim may lie in a base rim plane around the full circumference of the annular base.

According to an aspect of the invention, there is provided a joint comprising: a structure; an end of a fastener protruding from the structure; and a cap having an annular base terminating at a base rim and a mating feature on an external side of the annular base, the annular base being at least substantially in abutment with the structure and the cap forming a sealed air cavity around the end of the fastener, the joint comprising a cured sealing material in contact with at least part of the mating feature to secure the cap to the structure.

According to an aspect of the invention, there is provided a sealing material distribution tool for injecting sealing material around a spark prevention cap, the tool comprising: an annular passage, a sealing material inlet to the annular passage and a sealing material outlet from the annular passage, wherein the sealing material outlet has an annular configuration configured to distribute sealing material circumferentially about the spark prevention cap.

With such an arrangement the distribution of uncured sealant to bond the cap to the surface of the structure may be easily controlled. A substantially even distribution of sealant around the cap may be achieved.

The sealing material outlet may comprise a plurality of outlet apertures.

The plurality of outlet apertures may be spaced along the annular passage.

At least one of the plurality of outlet apertures may differ in size to another of the outlet apertures.

The diameter of at least one of the plurality of outlet apertures distal to the inlet may be greater than the diameter of at least one of the plurality of outlet apertures proximal to the inlet.

As such, an even flow of sealant from the tool around the circumference of a cap may be achieved.

At least one of the plurality of outlet apertures may be on at least one of an inner radial side of the annular passage and an underside of the annular passage.

The annular passage may comprise an annular pipe.

The annular pipe may be resilient.

The inlet may comprise an inlet pipe in fluid communication with the annular passage.

According to an aspect of the invention, there is provided a spark prevention cap installation system comprising at least one spark prevention cap as set out above and a sealing material distribution tool as set out above.

According to an aspect of the invention, there is provided an aircraft comprising at least one of the cap as set out above and the joint as set out above.

According to an aspect of the invention, there is provided a method of assembling the joint as set out above, the method comprising: fitting the cap over the end of the fastener; and injecting sealing material around the juncture of the structure and the cap.

According to an aspect of the invention, there is provided a method of forming a sealed cavity around an end of a fastener protruding from a surface of a structure, the method comprising: fitting a spark prevention cap over the end of the fastener; the spark prevention cap comprising a cap body with an annular base terminating at a base rim which surrounds an opening into a central cavity for receiving the end of the fastener; and the method further comprising: disposing a sealing material distribution tool for injecting sealing material around the spark prevention cap; and injecting sealing material through the sealing material distribution tool around the juncture of the structure and the cap.

The sealing material distribution tool may comprise an annular passage and a sealing material outlet from the annular passage with an annular configuration configured to distribute sealing material circumferentially about the spark prevention cap.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
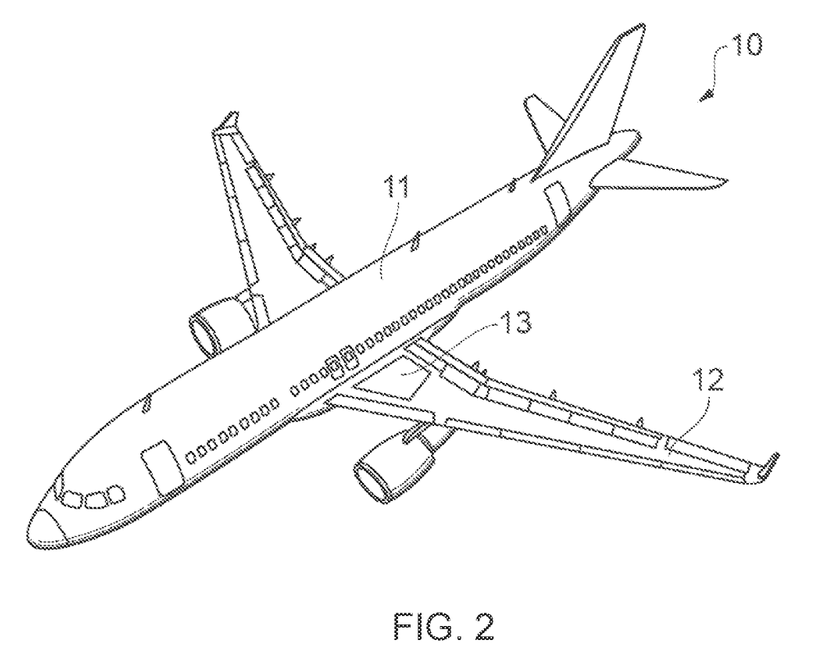
FIG. 2 shows a perspective view of an aircraft.

An aircraft 10 is shown in FIG. 2. The aircraft 10 includes a fuselage 11. Two wings 12 extend from the fuselage 11. It will be appreciated that the fuselage 11 and wings 12 may take a variety of different planform shapes and profiles depending on the particular application. Fuel tanks 13 are formed in the fuselage 11 and wings 12. One such fuel tank 13 is shown schematically in FIG. 2. The fuel tanks 13 are formed by a structure or structures forming part of the aircraft 10.

Figure 3:
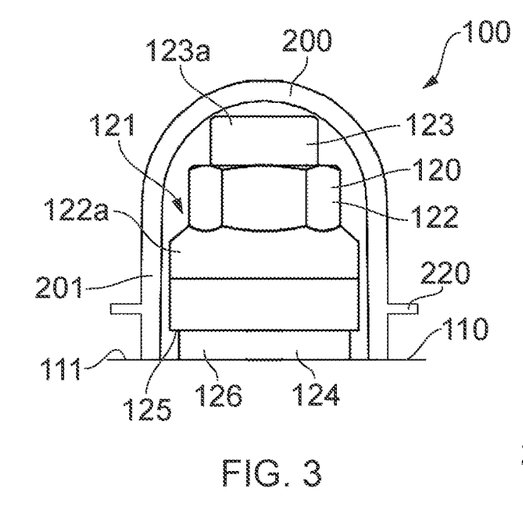
FIG. 3 shows a partial cross-sectional front view of a joint comprising a fastener and a cap prior to application of a sealant material.
Figure 4:
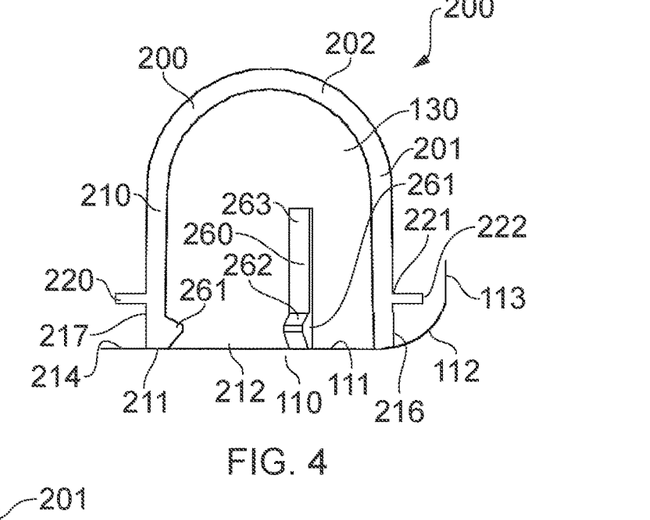
FIG. 4 shows a partial cross-sectional side view of the cap of FIG. 3.
Figure 7:
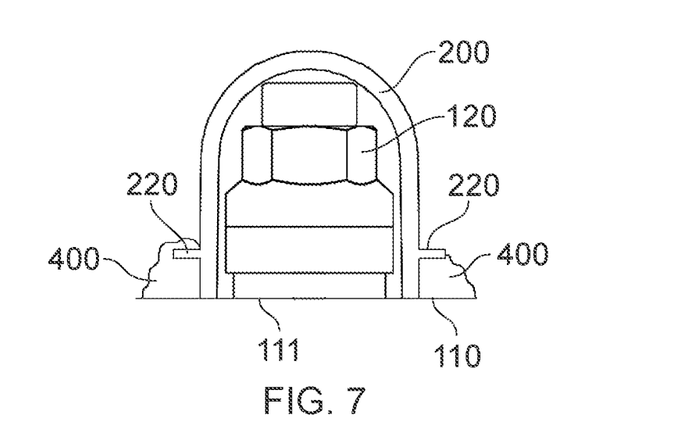
FIG. 7 shows a partial cross-sectional front view of the joint of FIG. 3 following application of a sealing material, with sealing material shown in contact with and enveloping a flange on the left hand side, and with sealant shown in contact with the flange on the right hand side.

FIGS. 3 and 7 show a joint 100 in stages of installation. A cap 200 of the joint 100 is shown in FIG. 4. The joint 100 is shown assembled in FIG. 7. The joint 100 comprises a structure 110 such as an aircraft skin panel. The structure 110 has a planar surface 111. A fastener 120 extends through the structure 110. The structure 110 in this embodiment is a composite aircraft structural component, but may be a hybrid composite-metallic or other component.

The structure 110 may include structural features, such as steps, corners, recesses, and other components. For example, in FIG. 4 a chamfer 112 is shown between the planar surface 111 and an upstanding feature 113.

An end 121 of the fastener 120 protrudes from the structure 110. The fastener 120 comprises a first fastening member 122 and a second fastening member 123. The first and second fastening members 122, 123 are engageable with each other.

The second fastening member 123 comprises an axially extending shaft 123a protruding from the structure 110. The first fastening member 122 comprises a nut 122a screwed onto the shaft 123a and a washer 124 between the nut 122a and the structure 110. The nut 122a is threadingly engageable on the shaft 123a. The fastener 120 defines a longitudinal axis.

The washer 124 is stepped. The washer 124 defines a step 125 of the fastener 120. In the Figures, the step 125 is formed by a diametrically recessed section 126 in an outer side of the washer 124. In an alternative embodiment, the washer 124 comprises first and second washer parts in which the second washer part has a smaller diameter than the first washer part. The step 125 may be formed by a groove in the washer 124 (not shown). In embodiments, the step is defined by the washer having a smaller outer diameter than the nut. In embodiments, the step is formed in the nut.

The cap 200 encloses the end 121 of the fastener 120 and will be described in detail with reference to FIGS. 3 to 11. The cap is a spark prevention cap. The cap 200 has a cap body 201 with a domed outboard (upper) part 202 and a substantially cylindrical base 210. The base 210 is annular. The base 210 terminates at a rim 211 which surrounds an opening 212 into a central cavity 130. The opening 212 is the only opening into the cavity 130. The opening 212 is provided to allow the end 121 of the fastener 120 to be inserted into the cavity 130. In embodiments, another sealed opening may be provided, for example at the upper end. Sealant is not received into the cavity 130 as will become apparent below. The rim 211 lies in a plane 214 so it can intimately engage with the planar surface 111 of the structure 110 around its full circumference when the cap 200 is fitted over the end 121 of the fastener 120 as shown.

A flange 220 extends from an inboard (inner) end 221 where it meets the cap body 210 to an outboard (outer) flange edge 222. The flange 220 is annular. The flange 220 extends perpendicularly from the cap body 210. A lower 216 portion of the cap body 210 extends between the flange 220 and the rim 211. The flange 220 is spaced from the rim 211. The flange edge 222 is spaced from the plane 214 in which the rim 211 lies. The flange 220 extends substantially parallel to the plane 214 in which the rim 211 lies. The flange 220 has an upper side and a lower side.

The base 210 has an external surface 217. The external surface 217 extends circumferentially. The external surface 217 extends from the rim 211. The flange 220 extends from the external surface 217. The external surface 217 is configured to contact with a sealant material applied externally to the cap 200. The base is a one-piece construction. The base 210 and flange 220 are formed as one-piece. The base and flange construction is formed from a rigid material. An axial spacing of the flange 220 from the base rim 211 is greater than a radial length of the flange 220, although dimensions of the flange 220 may vary.

The flange 220 acts as a mating feature. The flange 220 is configured to be at least partially adhered to sealant applied to the cap 200. A sealant receiving space is defined between the rim 211 and the flange 220. As such, a volume is defined between the flange 220, acting as a mating feature and the surface 111 of the structure 110 in which sealant is receivable. Spacing the flange 220 away from the base rim 211 assists with locating the cap 200 in proximity to other features.

Although in the present arrangement the flange 220 is provided as the mating feature, it will be understood that alternative configurations are possible. In embodiments, the flange 220 comprises spaced flange portions. In embodiments, the flange is omitted and alternative mating features are incorporated. Mating features may include protrusions, such a ridges and/or flanges, and recesses, such as channels.

Figure 5:
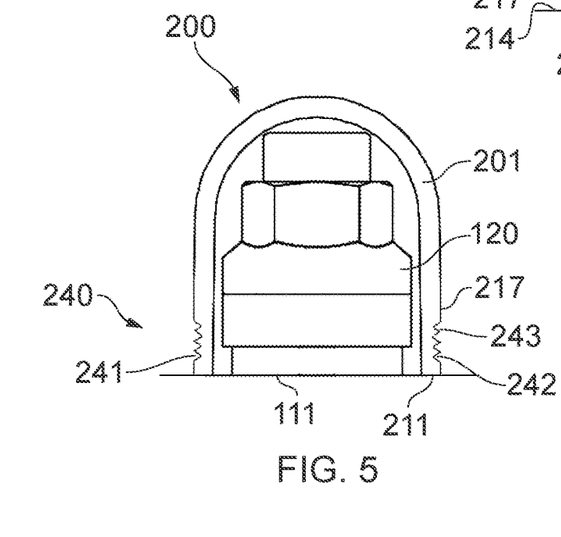
FIG. 5 shows a partial cross-sectional front view of another joint comprising a fastener and another cap prior to application of a sealant material.
Figure 6:
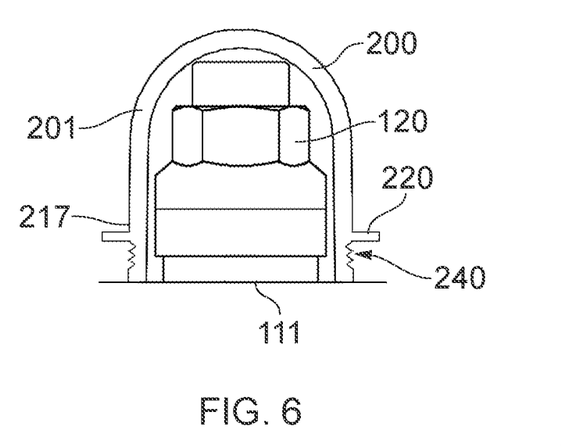
FIG. 6 shows a partial cross-sectional front view of another joint comprising a fastener and another cap prior to application of a sealant material.

For example, in FIG. 5 another embodiment is shown. In this embodiment the flange 220 is omitted and a recess configuration 240 is formed in the base 210. The recess configuration 240 comprises recesses 241. The recesses 241 are circumferentially extending channels 242. Four channels 242 are shown in FIG. 5, however it will be understood that the number of channels 242 may vary, and may be a single channel. The or each channel 242 may include channel sections. The channels 242 are recessed in the external surface 217. A ridge 243 is defined between each pair of channels 242. The ridges 243 extend planar with the external surface 217. In an embodiment, one or more ridges 243 is recessed from the external surface 217. The or each channel 242 may be formed by protruding ridges. In FIG. 6, another embodiment is shown including both the flange 220 and the recess configuration 240.

With the embodiments described above, the cap body 201 is formed with a locating configuration 260 as shown in FIG. 4. The locating configuration 260 comprises an engaging feature 261. The engaging feature 261 is configured to engage with the end 121 of the fastener 120. The engaging feature 261 includes three protrusions 262. The protrusions 262 are hooks. The protrusions 262 act as tabs. The protrusions 262 project inwardly into the central cavity 130. The protrusions 262 protrude radially inwardly. The protrusions 262 are formed at the lower, inboard, end of the cap body 201. The protrusions 262 are proximate the base rim 211. In the present embodiment the cap 200 is formed with three protrusions 262, however the number may differ. The protrusions 262 are dispersed equidistantly around the base 210.

Each protrusion 262 is on a rib 263. The ribs 263 extend axially and project inwardly into the central cavity 130. In embodiments, the ribs 263 abut end 121 of the fastener 120. The ribs 263 may be omitted.

Each protrusion 262 is configured to abut against the step 125. The locating configuration 260 locates the rim 211 against the surface 111. The protrusions 262 oppose each other in the cavity 130. That is, at least two protrusions 262 are disposed at greater than 90 degrees to each other. With three evenly distributed protrusions, the protrusions 262 are disposed at 120 degrees to each other, for example.

When the cap 200 is fitted over the end 121 of the fastener 120, the rim 211 lies in its plane so it can intimately engage with the planar surface 111 of the structure 110 around its full circumference. This helps prevent leakage of air and sealant into the inner cavity 130. During forming of joint 100, the cap 200 is retained on the fastener 120 and the base rim 211 abuts the surface 111. The engaging feature 261 helps retain the rim 211 substantially in contact with the surface 111.

The cap is integrally formed by injection moulding or similar. A suitable material is a nylon material, such as Nylon PA66 or Nylon PA12.

A suitable sealing material is a polythioether sealant such as PPG PR-2001B2 or a polysulphide sealant such as Naftoseal® MC238B, MC238A, or MC780 available from Chemetall Group.

Figure 8:
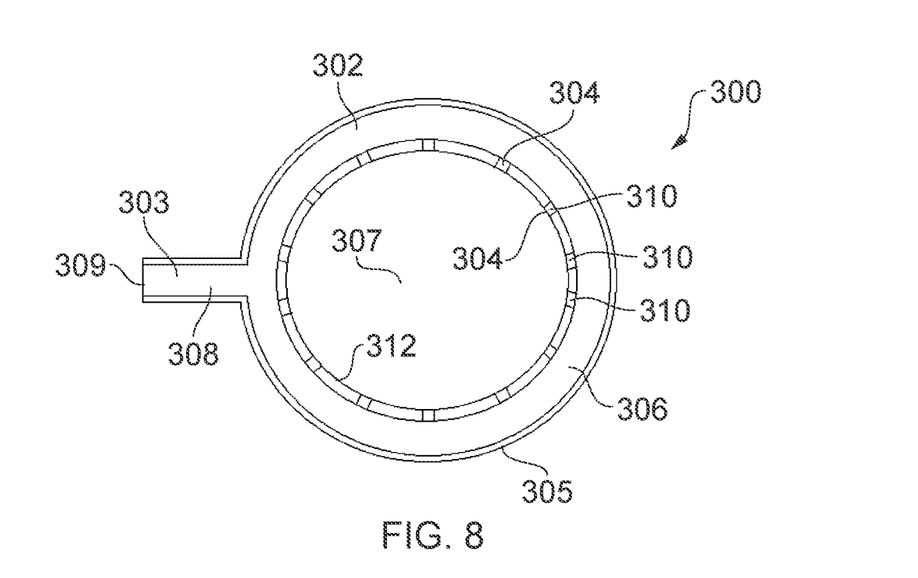
FIG. 8 shows a partial cross-sectional view from above of a sealing material distribution tool.
Figure 9:
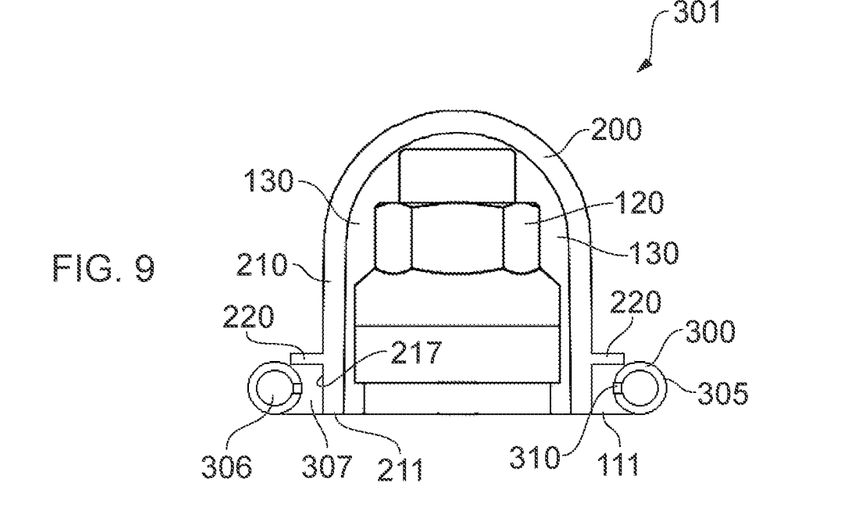
FIG. 9 shows a partial cross-sectional front view of the joint of FIG. 3 with the tool of FIG. 8 disposed over the cap prior to application of a sealing material.

A sealing material distribution tool 300 is shown in FIG. 8. The tool 300 is shown in cross-section. FIG. 9 shows the tool 300 located over the cap 200. The sealing material distribution tool 300, together with a plurality of caps 200, forms a spark prevention cap insulation system. The number of caps 200 may vary. It will be understood that the tool 300 is useable to install a plurality of the caps 200.

The sealing material distribution tool 300 is configured to be received around the cap 200. The tool is configured to be received over the cap 200 when the cap is received on the end 121 of the fastener 120, as shown in FIG. 9. The tool 300 comprises a sealing material flow passage 302 which extends between a sealing material inlet 303 and a sealing material outlet 304.

The tool 300 comprises an annular tube 305. The annular tube 305 defines an annular passage 306. The annular passage provides a flow path around the exterior of the cap 200 when the tool 300 is provided over the cap 200. The tool 300 is formed as an annulus. A cap receiving space 307 is formed on an inner side of the annular tube 305. The inner diameter of the annular tube 305 is configured to correspond substantially to the diameter of the base 210 of the cap 200. It will be understood that the dimensions of the tool 300 correspond to the dimensions of the cap 200 that the tool 300 is intended to install. The annular tube 305 is formed from a resilient material. The tube 305 is flexible, and is formed from a suitable material such as rubber. The annular tube 305 is resilient and so is expandable to form a suitable fit over the cap 200. The tool 300 is configured to retain its shape. The resilience of the tube 305 provides for the tool 300 to be disposed on or over the flange 220.

An inlet tube 308 fluidly communicates with the annular passage 306 in the annular tube 305. The inlet tube 308 forms the sealing material inlet 303. An inlet hole 309 is formed at a free end of the inlet tube 308. The inlet tube 308 connects with a sealing material injection device (not shown) to provide a flow of sealing material into the sealing material distribution tool 200. The inlet tube 308 is formed from a flexible material. Outlet apertures 310 are formed annularly around the tool 300. The plurality of outlet apertures 310 are spaced along the annular tube 305. The outlet apertures 310 fluidly communicate with the annular passage 306. In the embodiment shown in FIG. 8, the outlet apertures 310 are generally evenly distributed along the annular tube 305. However, it will be understood that the spacing between adjacent outlet apertures 310 may vary.

Figures 10, 11:
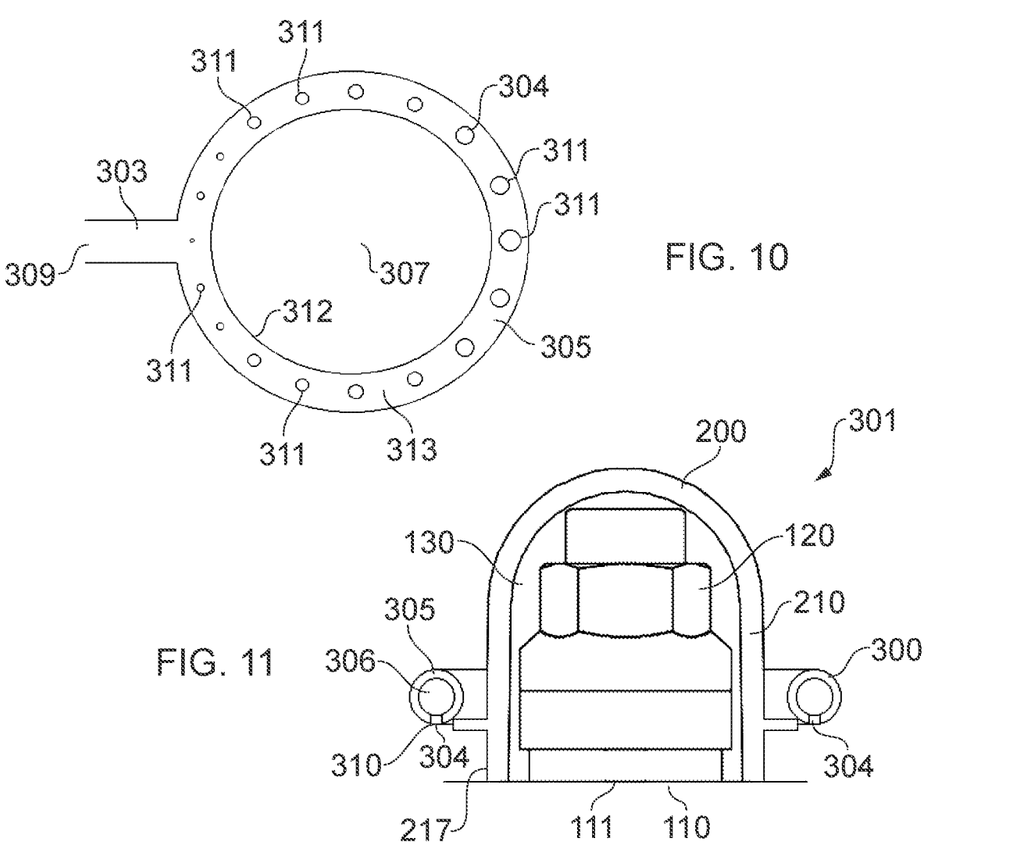
FIG. 10 shows a partial cross-sectional view from above of another sealing material distribution tool.
FIG. 11 shows a partial cross-sectional front view of the joint of FIGS. 3 and 4 with the tool of FIG. 10 disposed over the cap prior to application of a sealing material.

In the embodiment in FIGS. 8 and 9, the outlet apertures 310 are on an inner radial side 312 of the annular tube 305. The outlet apertures 310 on the inner radial side 312 are configured to inject a sealing material in an inwardly radial direction. With such an arrangement, sealing material will be injected directly towards the cap 200. In another embodiment, as shown in FIGS. 10 and 11, the outlet apertures 310 are on an underside 313 of the annular tube 305. The outlet apertures 310 on the underside 313 of the annular tube 305 extend in an axial direction. The outlet apertures 310 on the underside 313 are configured to distribute sealing material in the axial direction. With such an arrangement, the sealing material is directed towards the planar surface 111. It will be understood that the configuration of the outlet apertures 310 may vary. For example, the tool 300 in embodiments has outlet apertures 310 on both the inner radial side 312 and the underside 313. Outlet apertures 310 may extend at an acute angle between the inner radial side 312 and the underside 313.

In FIG. 8, the outlet apertures 310 are shown substantially with each outlet aperture 310 having substantially the same diameter. The diameter of two or more adjacent outlet apertures 310 may differ. An example of one such different outlet aperture arrangement is provided in FIG. 10. In such an arrangement, irrespective of the alignment of the outlet apertures 310, the diameter of the outlet apertures 310 increases away from the fluid communication with the inlet tube 308. That is, at least one outlet aperture 310 distal to the sealing material inlet 303 has a diameter greater than a diameter of another outlet aperture 310 proximal to the sealing material inlet 303. The diameter of the outlet apertures 310 incrementally increases along the annular tube 305 from proximal to the sealing material inlet 303 to distal from the sealing material inlet 303. Other arrangements are anticipated, for example the diameter may be stepped with groups of outlet apertures 310. By increasing the diameter of the outlet apertures 310 away from the inlet tube 308 it is possible to ensure a substantially even distribution of sealing material flow from the tool 300 around the cap 200 when the sealing material is injected. It will be understood that the pressure of the sealing material in the tool 300 will be greatest proximal to inlet tube 308.

During forming of the joint 100, the cap 200 is disposed over the end 121 of the fastener 120. The base rim 211 is moved into abutment with the surface 111. The cap 200 is retained over the fastener 120 by the engaging feature 261. With the rib 211 in abutment with the surface 111 the cavity 130 provides an air cavity defined by the cap 200 and the surface 111. The space on the inner side of the cap body 201 defines an interior of the cap 200. The space on the outer side of the cap body 201 defines an exterior of the cap 200. When the cap 200 is positioned, the sealing material distribution tool 300 is located over the cap 200. The position of the tool 300 with respect to the cap 200 may vary. For example, in one injection position the annular tube 305 is received over the flange 220 of the cap 200 to be at least partially received between the flange 220 and the surface 111. In another arrangement, the annular tube 305 is received around the cap base 210 but is retained above the flange 220, as shown in FIG. 11.

A nozzle of the sealing material injection device (not shown) to provide a flow of sealing material is connected with the sealing material inlet 303. A flow of sealing material is injected to the sealing material distribution tool 300 and flows along the inlet tube 308 to the annular passage 306. Sealing material is injected into the annular passage 306. The sealing material flows from the inlet 303 along the annular passage 306. The sealing material is forced out of the outlet apertures 310 and distributed about the cap 200. The sealing material is distributed annularly around the base 210 of the cap 200. The sealing material flows into contact with the external surface 217, the surface 111 of structure 110 and the flange 220. Due to the arrangement of the annular passage 306, sealant is applied simultaneously around the cap base 210. When the desired quantity of sealing material has flowed from the outlet apertures 310, the flow of sealing material into the inlet 303 is stopped. Sealing material is directed against the cap body 201 and is restricted from urging the cap 200 upwardly away from the surface 111. The engaging feature 261 retains the cap 200 over the end 121 of the fastener 120. As such, any gap being formed between the base 210 and the surface 111 is prevented. As such, leakage into the cavity 130 is prevented.

The sealing material is then allowed to cure, leaving a cured sealing material 400 as shown in FIG. 7. The cured sealing material 400 encompasses the juncture of the surface 111 and the external surface 217 of the cap base 210. As such a seal is formed around the cavity 130 of the cap 200. This seal prevents the ingress of water or other contaminants into the cavity 130, and also prevents plasma or other outgassing products from exiting the cavity 130 in the event of a new lightning strike. Cured sealing material 140 is also in contact with the flange 220. As such, the surface area of the cap 200 in which the cured sealing material is in contact is increased. This helps to aid retention of the cap over the fastener 120. As shown on the left side of FIG. 7, the sealing material may be allowed to flow to encompass the flange 220. Alternatively, as shown on the right side of FIG. 7 the sealing material may be allowed to flow and subsequently cured to contact the flange 220 but does not encompass the flange 220.

The tool 300 may be removed following application of the uncured sealing material around the cap 200. When the tool 300 is removed it may be used to apply sealant to another cap 200.

Where various features are described as being annular, these parts may have a circular cross-section. However, in the case of a non-circular cap assembly then these annular features will have a non-circular cross-sectional shape. The term "annular" is used herein to refer to a feature (for instance a rim, shoulder, protrusion or recess) which runs round a circumference of the cap assembly regardless of the shape of that circumference.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A joint comprising:
   a structure;
   an end of a fastener protruding from the structure; and
   a unitary cap having an annular base terminating at a base rim and an annular mating feature on an external side of the annular base,
   wherein the mating feature has an upper side and a lower side, and wherein the mating feature extends from an inboard end that meets the external side of the annular base to an outboard edge,
   the annular base being at least substantially in abutment with the structure and the cap forming a sealed air cavity around the end of the fastener, the joint comprising a cured sealing material enclosing at least part of the mating feature to secure the cap to the structure, and
   wherein the cured sealing material contacts the upper side, lower side and outboard edge of the mating feature.

2. An aircraft comprising the joint of claim 1.

3. A sealing material distribution tool for injecting sealing material around an external side of a spark prevention cap, the tool comprising:
   an annular passage,
   a sealing material inlet to the annular passage and a sealing material outlet from the annular passage,
   wherein the sealing material outlet has an annular configuration configured to distribute sealing material circumferentially about the external side of the spark prevention cap,
   wherein the sealing material inlet is configured so that the sealing material flows circumferentially from the inlet along the annular passage, and
   wherein the sealing material distribution tool is configured to be removed following application of the sealing material.

4. The tool of claim 3, wherein the sealing material outlet comprises a plurality of outlet apertures.

5. The tool of claim 4, wherein the diameter of at least one of the plurality of outlet apertures distal to the inlet is greater than the diameter of at least one of the plurality of outlet apertures proximal to the inlet.

6. The tool of claim 4, wherein at least one of the plurality of outlet apertures is on at least one of an inner radial side of the annular passage and an underside of the annular passage.

7. The tool of claim 3, wherein the annular pipe is resilient.

8. The joint of claim 1, wherein the mating feature comprises a flange protruding from the external side of the annular base.

9. The joint of claim 8, wherein the flange extends substantially parallel to the plane defined by the base rim from the juncture with the external side of the annular base to a free end of the flange.

10. The joint of claim 1, wherein the mating feature is spaced from the base rim.

11. The joint of claim 1, wherein the mating feature comprises at least one of a protrusion on the external side of the annular base and a recess in the external side of the annular base.

12. The joint of claim 11, wherein the mating feature is one of a plurality of mating features.

13. The joint of claim 11, wherein the at least one of the protrusion on the external side of the annular base and the recess in the external side of the annular base extends circumferentially.

14. The joint of claim 1, wherein the unitary cap comprises an engaging feature configured to engage with the end of the fastener and locate the base rim against the surface of the structure.

15. A one-piece spark prevention cap for forming a sealed cavity around an end of a fastener protruding from a surface of a structure, the cap comprising:
    a cap body with an annular base terminating at a base rim which surrounds an opening into a central cavity for receiving the end of the fastener;
    the annular base having an external circumferential surface extending from the base rim, and an annular flange on the external circumferential surface configured to contact a sealant material applied externally to the cap; and,
    wherein the flange has an upper side that extends substantially parallel to the plane defined by the base rim from the juncture with the external side of the annular base to a free end of the flange, and the flange has a lower side that extends substantially parallel to the plane defined by the base rim from the juncture with the external side of the annular base to a free end of the flange.

16. A one-piece spark prevention cap for forming a sealed cavity around an end of a fastener protruding from a surface of a structure, the cap comprising:
    a cap body with an annular base terminating at a base rim which surrounds an opening into a central cavity for receiving the end of the fastener; and,
    the annular base having an external circumferential surface extending from the base rim, and a recess in the external circumferential surface configured to contact a sealant material applied externally to the cap, wherein the recess comprises a circumferentially extending channel.

17. The cap of claim 16, wherein the recess is one of a plurality of recesses.

18. A method of forming a sealed cavity around an end of a fastener protruding from a surface of a structure, the method comprising:
    fitting a spark prevention cap over the end of the fastener;
    the spark prevention cap comprising a cap body with an annular base terminating at a base rim which surrounds an opening into a central cavity for receiving the end of the fastener; and the method further comprising:
    disposing a sealing material distribution tool for injecting sealing material around an external side of the spark prevention cap; and
    injecting sealing material through the sealing material distribution tool around the juncture of the structure and the cap, wherein the sealing material distribution tool comprises an annular passage and a sealing material inlet to the annular passage, wherein the sealing material flows circumferentially from the inlet along the annular passage and wherein the sealing material distribution tool is removed following application of the seal material.

19. The method of claim 18, wherein the sealing material distribution tool comprises an annular passage and a sealing material outlet from the annular passage with an annular configuration configured to distribute sealing material circumferentially about the spark prevention cap.

\* \* \* \* \*